(12) United States Patent
Harnisch et al.

(10) Patent No.: US 8,314,361 B2
(45) Date of Patent: Nov. 20, 2012

(54) DEVICE FOR LASER MACHINING

(75) Inventors: Gunter Harnisch, Koenigsbrueck (DE); Carsten Knobel, Sohland (DE); Rene Harig, Dresden (DE)

(73) Assignee: TRUMPF Sachsen GmbH, Neukirch (DE)

( * ) Notice: Subject to any disclaimer, the term of this patent is extended or adjusted under 35 U.S.C. 154(b) by 796 days.

(21) Appl. No.: 12/483,435

(22) Filed: Jun. 12, 2009

(65) Prior Publication Data

US 2009/0308851 A1 Dec. 17, 2009

(30) Foreign Application Priority Data

Jun. 12, 2008 (EP) .................................... 08010660

(51) Int. Cl.
*B23K 26/38* (2006.01)
*B23K 26/08* (2006.01)
(52) U.S. Cl. .............................. 219/121.67; 219/121.84
(58) Field of Classification Search ............. 219/121.67, 219/121.78, 121.84, 121.73, 121.75
See application file for complete search history.

(56) References Cited

U.S. PATENT DOCUMENTS

| | | | | |
|---|---|---|---|---|
| 4,997,250 | A | | 3/1991 | Ortiz, Jr. |
| 5,109,148 | A | * | 4/1992 | Fujita et al. ............. 219/121.78 |
| 5,231,264 | A | * | 7/1993 | Fujita ....................... 219/121.78 |
| 5,667,707 | A | | 9/1997 | Klingel et al. |
| 5,897,800 | A | * | 4/1999 | Sawai et al. ............. 219/121.79 |
| 6,018,135 | A | * | 1/2000 | Weick ....................... 219/121.79 |
| 6,501,043 | B1 | * | 12/2002 | Ruben ....................... 219/121.64 |
| 2003/0196993 | A1 | | 10/2003 | Jennings |
| 2005/0150876 | A1 | | 7/2005 | Menin et al. |
| 2006/0157457 | A1 | * | 7/2006 | Sakurai et al. ........... 219/121.76 |

FOREIGN PATENT DOCUMENTS

| | | |
|---|---|---|
| DE | 9407288 | 8/1994 |
| EP | 1716963 | 11/2006 |
| JP | 5-8079 A * | 1/1993 |
| JP | 6-335883 A * | 11/1994 |
| JP | 11-221692 A * | 8/1999 |
| JP | 2002-316291 A * | 10/2002 |
| JP | 2002-361467 A * | 12/2002 |
| JP | 2003-71584 A * | 3/2003 |

OTHER PUBLICATIONS

International Search Report from corresponding European Application No. EP 08 01 0660, mailed Nov. 27, 2008, 6 pages.
Product Information for Trumatic HSL 2502, Trumpf GmbH + Co., Ditzingen, Germany, Feb. 2000, 43 pages.

* cited by examiner

*Primary Examiner* — Geoffrey S Evans
(74) *Attorney, Agent, or Firm* — Fish & Richardson P.C.

(57) ABSTRACT

Devices for laser machining include a machining head for directing laser light towards a workpiece, the laser light being emitted from a laser light source and directed along an optical beam path and the machining head including one or more focusing optics that are arranged in the optical beam path, a collimator including one or more collimating optics that are arranged in the optical beam path in front of the focusing optics and the collimator having an axis that extends parallel to the main direction of the laser light at the collimating optics, one or more deflecting optics arranged in the optical beam path between the collimating optics and the focusing optics, the deflecting optics configured to deflect the laser light emerging from the collimating optics towards the focusing optics, wherein the machining head is adjustable relative to the collimator along a z-axis, and the axis of the collimator extends under an angle to the z-axis.

18 Claims, 4 Drawing Sheets

DEVICE FOR LASER MACHINING

CROSS REFERENCE TO RELATED APPLICATION

This application claims priority under 35 U.S.C. §119(a) to European Patent Application No. 08 010 660.2, filed Jun. 12, 2008, the entire contents of which are hereby incorporated by reference.

TECHNICAL FIELD

The invention relates to machining workpieces, for example metal sheets, and in particular, to laser machining.

BACKGROUND

U.S. Pat. No. 6,501,043 B1 discloses a mechanical device for the machining of workpieces with a laser beam, wherein a collimator with collimating optics and a machining head with focusing optics are rigidly connected to one another.

SUMMARY

In general, in one aspect, the invention features devices for laser machining that include an optical system with a collimator, one or more deflecting optics, and a machining head. The optical system is configured to provide an optical beam path for laser light from an input of the collimator to an output of the machining head. The machining head including one or more focusing optics and configured to direct the laser light through the output towards a workpiece. The collimator including one or more collimating optics. The one or more deflecting optics arranged between the collimating optics and the focusing optics and configured to deflect the laser light emerging from the collimating optics towards the focusing optics. The machining head is adjustable relative to the collimator along a z-direction and the main propagation direction of the optical beam path within the collimator intersects with the z-direction.

In another aspect, the invention features devices for laser machining that include a receiver for receiving laser light from a light source, a machining head for directing the laser light towards a workpiece, the machining head including one or more focusing optics, a collimator arranged between the receiver and the focusing optics, the collimator including one or more collimating optics, and one or more deflecting optics between the collimating optics and the focusing optics, the deflecting optics being configured to deflect the laser light emerging from the collimating optics towards the focusing optics. The machining head is adjustable relative to the collimator along a z-axis. The machining head, the deflecting optics, and the collimating optics provide an optical beam path for the laser light from the receiver to the focusing optics. The collimating optics are positioned in the optical beam path between the receiver and the deflecting optics. The optical beam path of the laser light emerging from the collimating optics to the deflecting optics intersects with the z-axis.

In another aspect, the invention features devices for laser machining that include a machining head for directing laser light towards a workpiece, the laser light being emitted from a laser light source and directed along an optical beam path and the machining head including one or more focusing optics that are arranged in the optical beam path, a collimator including one or more collimating optics that are arranged in the optical beam path in front of the focusing optics and the collimator having an axis that extends parallel to the main direction of the laser light at the collimating optics, and one or more deflecting optics arranged in the optical beam path between the collimating optics and the focusing optics, the deflecting optics configured to deflect the laser light emerging from the collimating optics towards the focusing optics, wherein the machining head is adjustable relative to the collimator along a z-axis, and the axis of the collimator extends under an angle to the z-axis.

In another aspect, the invention features devices for laser machining that include a machining head for directing laser light towards a workpiece, the laser light being emitted from a laser light source and directed along an optical beam path and the machining head including one or more focusing optics that are arranged in the optical beam path, a collimator including one or more collimating optics that are arranged in the optical beam path in front of the focusing optics and the collimator having an axis that extends parallel to the main direction of the laser light at the collimating optics, and one or more deflecting optics arranged in the optical beam path between the collimating optics and the focusing optics, the deflecting optics configured to deflect the laser light emerging from the collimating optics towards the focusing optics, wherein the machining head is adjustable relative to the collimator along a z-axis, and the axis of the collimator extends traversely to the z-axis.

Embodiments of these devices can include one or more of the following features.

In some embodiments, the devices include a carriage, the collimator being fixedly arranged in the z-direction relative to the carriage and the machining head being translatable in the direction of the z-direction relative to the carriage.

In some embodiments, the collimator is configured such that the optical beam path within the collimator extends at a right angle with respect to the z-direction and the deflecting optics are configured to deflect the laser light by 90°. In these embodiments, a particularly small overall height in the z-direction of the z-axis with, simultaneously, a simple laser beam guide between the collimating optics and the focusing optics can be reached.

While in some embodiments, the axis of the collimator extends at a right angle to the z-direction, in certain embodiments, angles deviating from a right angle are also possible.

In some embodiments, the devices include a beam guidance chamber for the laser light positioned between the collimator and the machining head, the beam guidance chamber including a chamber wall connected to the collimator and the machining head and being configured to be adjustable in length in the direction of the z-direction. The chamber wall of the beam guidance chamber can be at least partly formed by a bellows that is extendable and compressible in the direction of the z-direction. The beam guidance chamber can be filled with a gaseous medium (e.g., air or a gaseous medium different from air) and can be substantially hermetically sealed and fluidically connected to a gas compensation chamber to compensate for volume changes in the beam guidance chamber, which volume changes occur as a result of a movement of the machining head along the direction of the z-direction.

During operation, the internal pressure in the beam guidance chamber can be increased in relation to the pressure in the environment surrounding the beam guidance chamber.

In some embodiments, the beam guidance chamber can include, in its interior, a dirt absorber for absorbing contaminants within the beam guidance chamber.

In some embodiments, the devices can include a motion unit with a bridge and a first translation drive configured to move the machining head along a y-direction, the y-direction being orthogonal to the z-direction. For example, the optical system can be mounted to the bridge via the first translation drive to be movable along a y-direction. The motion unit can further include a mechanical base and a second translation drive, the bridge mounted to the mechanical base via the second translation drive to be movable along an x-direction, the x-direction being orthogonal to the y-direction and the z-direction.

In some embodiments, the devices include a third translation drive configured to move the machining head along the z-direction relative to the collimator.

In some embodiments, the optical beam path of the laser light within the collimator intersects with the z-direction. For example, the optical beam path of the laser light within the collimator is configured to have an angle in the range between and including 45° and 90°.

In some embodiments, a collimator axis of the collimator extends parallel to the main direction of the laser light at the collimating optics intersects with the z-direction.

In some embodiments, the optical beam path of the laser light emerging from the collimating optics to the deflecting optics and/or the optical beam path within the collimator and/or the axis of the beam collimator intersects with the z-axis under an angular range between and including 60° and including 90°, for example, 65°, 70°, 75°, 80°, 85°, 88°, 89°. For example, the optical beam path of the laser light emerging from the collimating optics to the deflecting optics and/or the optical beam path within the collimator and/or the axis of the beam collimator can extend transversely to the z-direction.

In some embodiments, the devices include a light source and an optical fiber, wherein the light source is optically connected to the input of the collimator via the optical fiber. For example, the optical fiber can be connected to a fiber connector in a housing of the collimator.

In some embodiments, the axis of the optical fiber at the input of the collimator is at an angle in the range between and including 45° and 90° with respect to the z-direction.

Among other advantages, in some embodiments, the devices feature a compact construction of an optical system with a collimator and a machining head that operates in a functionally reliable manner and permits high quality laser machining.

In some embodiments, the collimator is orientated so that its axis extends transversely to the z-direction, e.g., transversely to the axis of the machining beam which is directed from the machining head towards the workpieces to be machined.

In some embodiments, a relatively small overall height of the optical system including the machining head and the collimator can be produced in the z-direction.

In some embodiments, the devices include the light source. The light source can be optically connected to the receiver via a optical fiber.

Owing to its orientation, the collimator can project transversely to the z-direction. Depending upon the focal distance of the collimating optics and its adjustment path, the collimator can have a considerable overall length in the direction of its axis.

In the case that the collimator is simultaneously rigidly connected to the machining head and, consequently, the collimator moves jointly during adjustment movements of the machining head in the direction of the z-direction, the collimator may, in particular in the case of highly dynamic adjustment movements, start to vibrate and thereby impair the functioning ability of the laser beam guide and, ultimately, the quality of the laser beam machining process.

To avoid or reduce such phenomena, the movement of the machining head of the device can be decoupled from the collimator during adjustment movements in the z-direction. The decoupling, e.g., the movability of the machining head relative to the collimator, can permit a compact construction of the optical system comprising the machining head and the collimator without having to accept reductions in the efficiency of the mechanical device. The decoupling of the machining head and the collimator during adjustment movements of the machining head can be advantageous in cases in which the collimator has a motor-driven adjusting device for the collimating optics and therefore has a correspondingly large mass which, if the collimator and the machining head were rigidly coupled, would have to be moved jointly with the machining head.

In some embodiments, the collimator is fixed in the z-direction. Accordingly, movements in this direction are then executed exclusively by the machining head.

In some embodiments, the overall height in the z-direction is small with, simultaneously, a simple laser beam guide between the collimating optics and the focusing optics, where the axis of the collimator extends, for example, at a right angle to the z-direction. However, angles deviating from a right angle are also possible.

Some embodiments can ensure trouble-free, efficient and qualitatively high-grade laser machining irrespective of the relative movability of the machining head and the collimator in the direction of the z-axis.

For example, the laser beam can extend between the collimating optics and the focusing optics in a beam guidance chamber bounded by a chamber wall. The length of the chamber wall of the beam guidance chamber can be variable according to the movements executed by the machining head in the direction of the z-axis. Inside the beam guidance chamber, the laser beam can be protected against harmful environmental influences.

In some embodiments, the chamber wall of the beam guidance chamber of the device is formed by a reliable bellows which is expandable and compressible in the direction of the z-axis.

In some embodiments, the composition of the gaseous medium is adapted to the laser beam extending within the beam guidance chamber and ensures that the laser beam properties that are critical to the success of the workpiece machining process are not impaired. The hermetic seal of the beam guidance chamber can keep harmful environmental influences, in particular gases that are detrimental to the power of the laser beam, away from the laser beam. The gas compensation volume can ensure that the internal pressure in the beam guidance chamber remains substantially constant, irrespective of the adjustment movements executed by the machining head.

Excess pressure can prevail in the beam guidance chamber at least between the collimating optics and the focusing optics and thereby prevent the ingress of harmful substances into the interior of the beam guidance chamber.

Contaminants that have undesirably entered the beam guidance chamber can be absorbed by a dirt absorber provided in the interior of the beam guidance chamber and thereby kept away from the laser beam and optical elements. Absorber films, for example, can be used as dirt absorbers.

The details of one or more embodiments are set forth in the accompanying drawings and the description below. Other features and advantages will be apparent from the description and drawings, and from the claims.

DETAILED DESCRIPTION

An example of a device for the machining of metal sheets is described in connection with FIGS. 1-4. Specifically, the device is configured as a laser cutting machine 1. Laser cutting machine 1 is a flat-bed machine that includes a motion unit 2, a stationary workpiece support 3, and an optical system 5. Optical system 5 is mounted to motion unit 2 and is displaceable over workpiece support 3.

Figure 3:
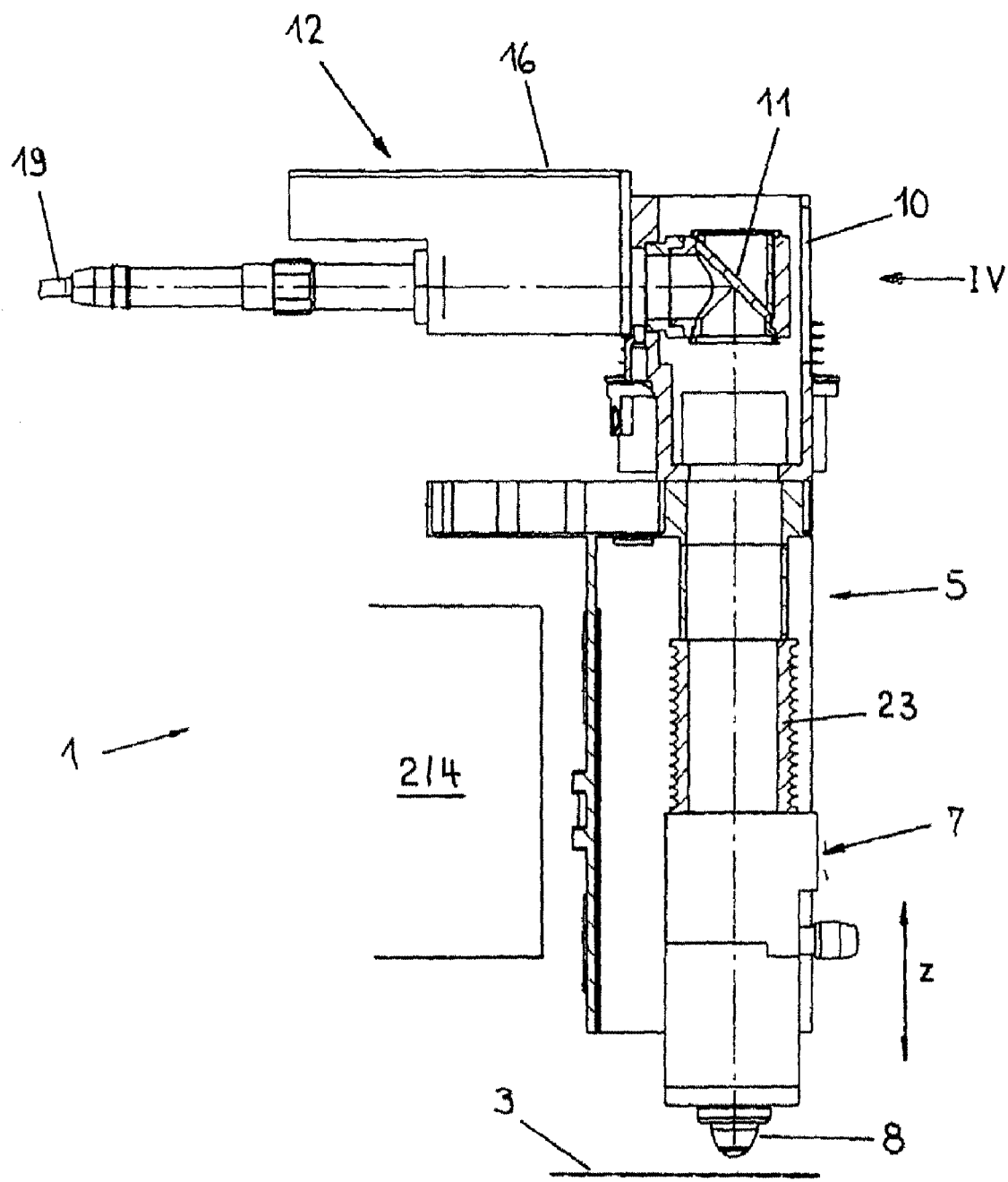
FIG. 3 is a partial sectional view of the optical system of FIG. 2, in a second operating state.
Figure 4:
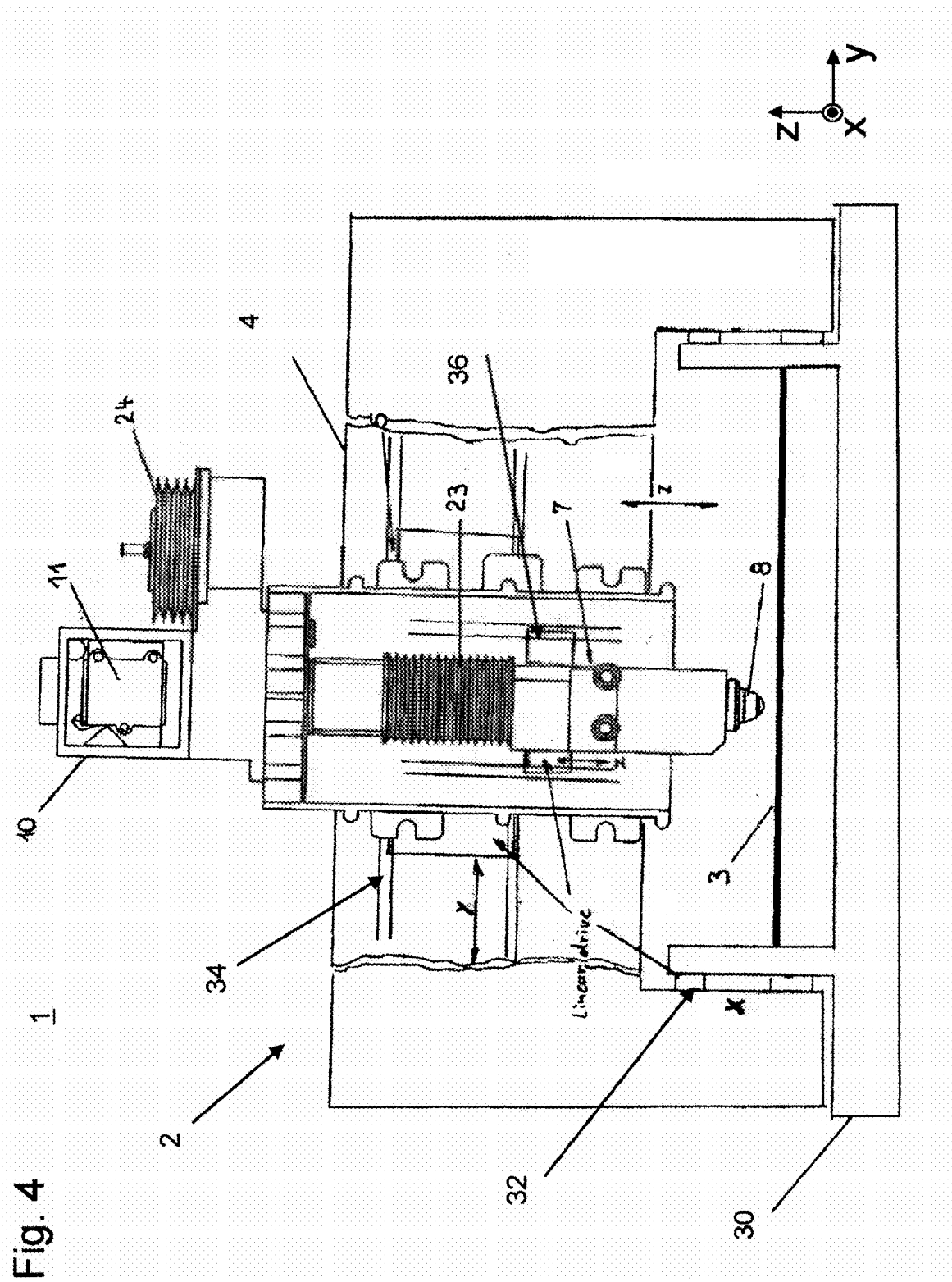
FIG. 4 is a front view of a laser cutting machine with the optical system of FIGS. 1-3, in viewing direction of the arrow IV in FIG. 3.

Referring to FIG. 4, motion unit 2 includes a mechanical base 30 and a bridge 4. Bridge 4 spans over workpiece support 3 and can be moved relative to workpiece support 3 in the direction of an x-axis using a first linear drive unit 32. Bridge 4 carries and guides optical system 5 that is movable along bridge 4 in the direction of a y-axis using a second linear drive unit 34. The directions of the x-axis and the y-axis are indicated by double arrows in FIGS. 1-4 and are aligned, for example, with a horizontal plane. Being movable in x- and y-direction using first drive unit 32 and second drive unit 34, optical system 5 can travel to essentially any point on workpiece support 3 in the x-y-plane and, can, thus, allow laser machining at essentially any point on a metal sheet placed on workpiece support 3.

Optical system 5 includes a carriage 6, a laser cutting head 7, a deflection unit, and a collimator 12.

Carriage 6 is guided along tracks on bridge 4 in the direction of the y-axis and can be displaced using second linear drive 34. Carriage 6 carries laser cutting head 7 as a machining head.

Laser cutting head 7 is configured to be movable relative to carriage 6 in the direction of a z-axis (e.g., a vertical axis) using a third linear drive 36. In some embodiments, a toothed-belt drive can be used alternatively or in addition to third linear drive 36. Laser cutting head 7 includes a conventional cutting nozzle 8 facing workpiece support 3 and focusing optics within laser cutting head 7, e.g., a conventional focusing lens 9.

While laser cutting head 7 is movable mounted to carriage 6, the deflection unit, including a deflection housing 10 and deflecting optics, e.g., a deflecting mirror 11, are rigidly connected to carriage 6 and is therefore fixed in the z-direction relative carriage 6 and bridge 4.

Collimator 12 is flanged onto deflection housing 10. Alternatively or additionally, collimator 12 can be fixedly mounted to carriage 6. A collimator axis 13 of collimator 12 extends in the x-y-plane and is therefore aligned perpendicularly to the z-axis. Collimator 12 includes a collimating optics in the form of, e.g., a collimating lens 14 and an adjusting drive 15. Adjusting drive 15 can be formed as a spindle drive and allows to adjust the position of collimating lens 14 along collimator axis 13. Both adjusting drive 15 and collimating lens 14 are accommodated inside a collimator housing 16 of collimator 12.

Figure 1:
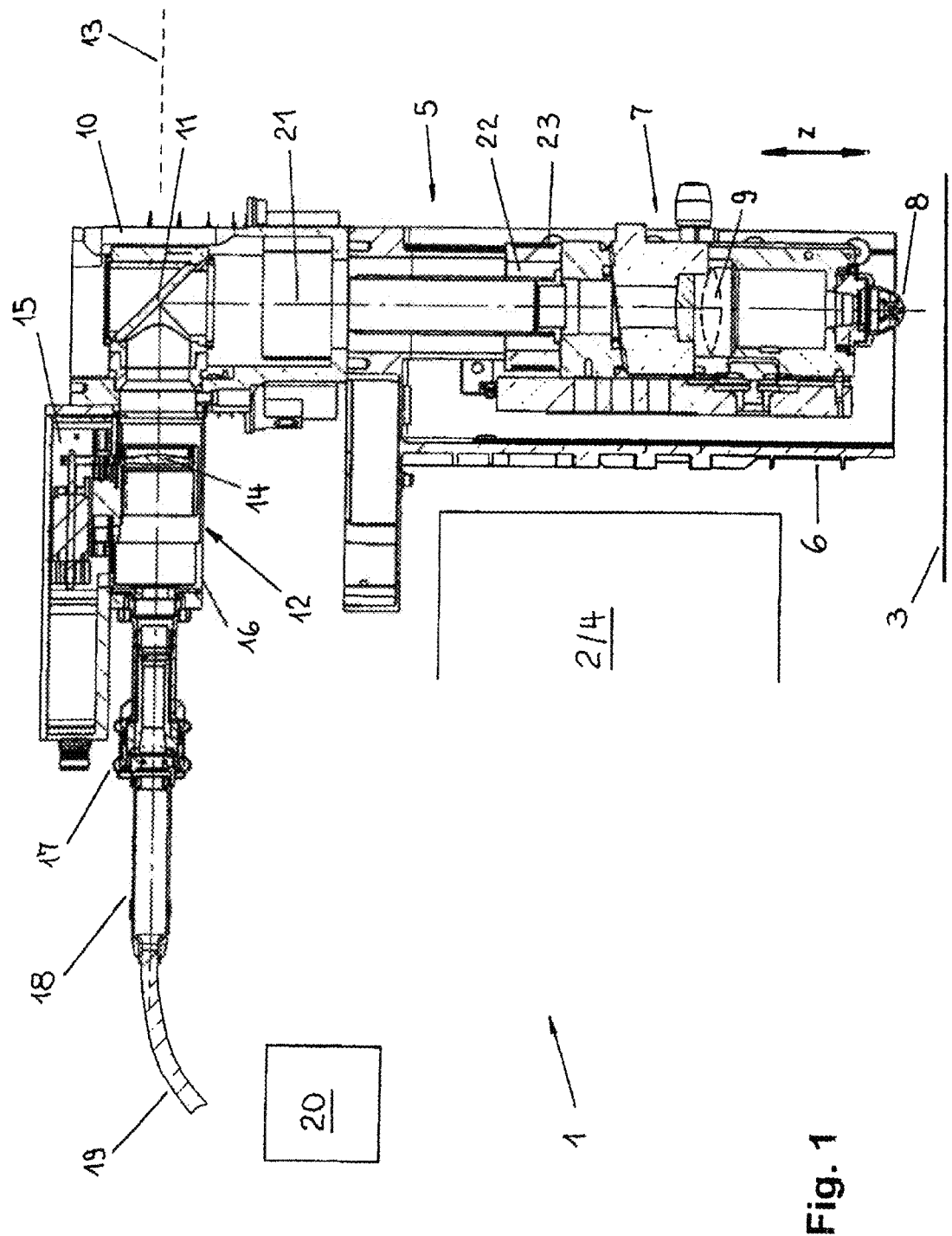
FIG. 1 is a sectional view of an optical system of a laser cutting machine for machining metal sheets, in a first operating state.

Collimator housing 16 includes further a fiber receiver 17 at the side remote from the deflection unit. Fiber receiver 17 is configured to receive a fiber plug 18 of an optical fiber 19. Optical fiber 19 guides light, e.g., laser light from a light source to optical system 5. An example of a light source is a solid-state laser 20 as shown in FIG. 1. Solid-state laser 20 generates a laser beam which is fed into optical fiber 19 and is supplied by the optical fiber 19 to optical system 5. A beam axis 21 of the laser beam is shown within optical system 5.

Collimator axis 13 coincides with the axis of laser beam 21, which passes through collimating lens 14. As an alternative or in addition to collimator lens, a mirror arrangement can be used to collimate laser beam 21. In that case, collimator axis 13 can be defined as the direction (main direction) in which the connection between the entry and exit points of laser beam 21 extends at the collimating optics.

During laser machining, laser beam 21 propagates along a laser beam path through collimator 12, the deflection unit, (eventually a beam guidance chamber which is described below), and laser cutting head. Specifically, laser beam 21 emitted from optical fiber 19 is collimated by collimator 12, e.g., by passing through collimating lens 14 of collimator 12. In general, the laser beam path extends along collimator axis 13. After passing through collimating lens 14, deflecting mirror 11 deflects laser beam 21 by 90° towards focusing lens 9. Thus, the laser beam path changes direction.

In general, the deflecting optics, e.g., deflecting mirror 11, can be tiltable or pivotable. This allows aligning the laser beam path of laser beam 21 parallel with the z-axis after the deflection. Before the focusing lens, laser beam 21 can be considered to be a raw beam. Focusing lens 9 generates then the laser cutting beam, which serves as a machining tool. The laser cutting beam is directed from focusing lens 9 towards the metal sheet to be machined and placed on workpiece support 3. The laser beam path ends accordingly at the workpiece.

In some embodiments, laser cutting machine 1, e.g., the position of the linear drives, the deflecting mirror, and/or the light source, is numerically controlled using a computerized control unit.

In some embodiments, as shown in FIGS. 1-4, optical system 5 includes also a beam guidance chamber 22 and eventually a gas compensation chamber 24.

In particular, laser beam 21 propagates then within beam guidance chamber 22 between deflection housing 10 and laser cutting head 7. The chamber wall of beam guidance chamber 22 is formed by, e.g., a conventional bellows 23. Bellows 23 is connected at one end to deflection housing 10 and at the other end to laser cutting head 7. Bellows 23 can be extended and compressed in direction of the z-axis.

Figure 2:
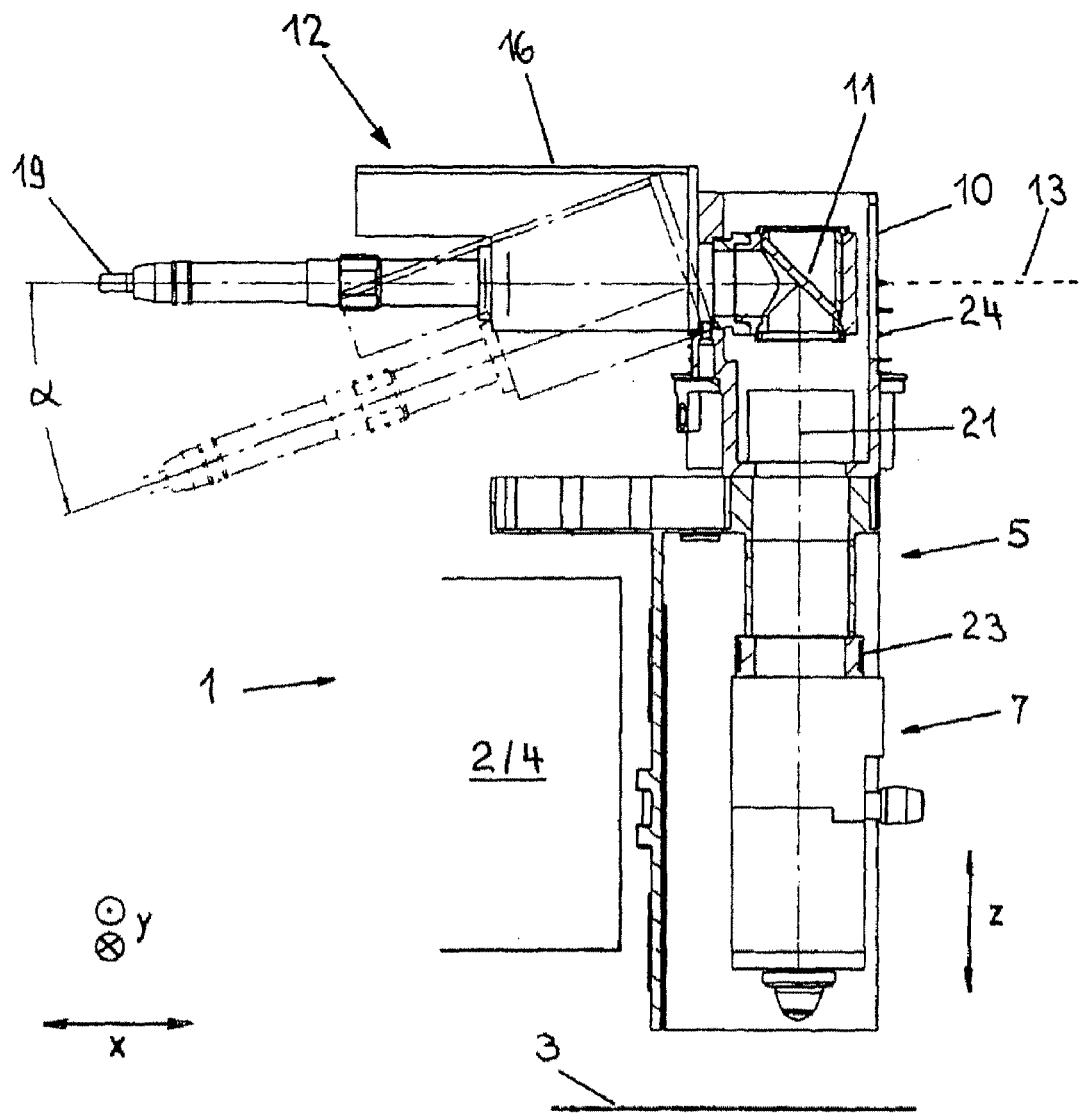
FIG. 2 is a partial sectional view of the optical system of FIG. 1.

In some embodiments, beam guidance chamber 22 is filled with cleaned air and is substantially hermetically sealed from the environment surrounding optical system 5. Beam guidance chamber 22 can be fluidically connected via a flow duct (not shown in detail) to bellows-type gas compensation chamber 24 shown in FIG. 4. In FIGS. 1 to 3, gas compensation chamber 24 is substantially concealed by deflection housing 10. The pressure inside the beam guidance chamber 22 (and in some embodiments the complete optical system) slightly exceeds the ambient pressure.

The gas filling of beam guidance chamber 22 and the increased pressure within beam guidance chamber 22 protects laser beam 21 inside beam guidance chamber 22 against harmful environmental influences, for example, performance-reducing gases. In addition, a dirt absorber can absorb solid contaminants that entered the interior of beam guidance chamber 22 (or complete optical system 5) despite the protective measures taken and that are thereby kept away from laser beam 21.

At the beginning of a machining process (e.g., a laser cutting operation), laser cutting head 7 is moved along the z-axis into a position in which cutting nozzle 8 is spaced, for example, about a millimeter away from the surface of the metal sheet to be machined. Good laser machining results can be achieved with nozzle distances adapted to the focusing features of the optical elements and beam parameters. To set the desired distance from the surface of the metal sheet to be machined, laser cutting head 7 performs an adjustment movement in direction of the z-axis before the start of the cutting operation.

At the end of the machining process as well as in between succeeding machining areas, laser cutting head 7 can be raised along the z-axis. Also during the machining process, laser cutting head 7 can be adjusted along the z-axis to maintain the initially set nozzle distance from the surface of the metal sheet, thereby compensating, for example, variations in the thickness of the metal sheet.

Adjustment movements of laser machining head 7 during the machining process can be highly dynamic. An increased dynamics of the adjustment movements of laser cutting head 7 can be reached because the movements of laser cutting head 7 is decoupled from the remaining components of optical system 5. Specifically, exclusively laser cutting head 7 moves in direction of the z-axis during the adjustment movements.

In contrast, collimator 12 with optical fiber 19 connected thereto is fixed with respect to any movement in direction of the z-axis. Thus, only the mass of laser cutting head 7 is moved in direction of the z-axis during the adjustment movements of laser cutting head 7.

In addition, in some embodiments, vibrations of collimator 12 can be reduced if not avoided. Without the decoupling of the movability of laser cutting head 7, vibrations could assume considerable proportions owing to the extension of collimator 12 perpendicularly to the direction of the z-axis and consequently lead to impaired guiding of laser beam 21.

Moreover, the orientation of collimator 12 in the x-y-plane produces a compact construction of optical system 5. In addition, optical fiber 19 can be attached to extend essentially in the x-y-plane, thereby avoiding stress that can occur in a bending fiber that is connected in vertical direction. In addition, optical fiber 19 can extend with a radius of curvature which is greater than the minimum radius required for optical fibers.

In some embodiments the foregoing described orientation of collimator 12 can be modified to an acute angle α with respect to the z-axis. Such an orientation of collimator 12 is indicated by the dot-dash line in FIG. 2. An adapted deflection angle within the deflection unit may then be required In FIGS. 1 and 2, laser cutting head 7 is located in a raised starting position, while in FIGS. 3 and 4, laser cutting head 7 has been lowered towards workpiece support 3 in a machining position. Accordingly, in FIGS. 3 and 4, bellows 23 has been extended relative to the conditions and the volume within gas compensation chamber 24 has been reduced in comparison with the starting position of FIGS. 1 and 2.

The above described device can have advantages with respect to commercially available machines. For example, the above described device can have advantages with respect to the "Trumatic® HSL 2502" device made by the company TRUMPF® Werkzeugmaschinen GmbH+Co. KG, 71254 Ditzingen, Germany. The "Trumatic® HSL 2502" device includes a machining head that has focusing optics for directing a laser beam towards a workpiece. The laser beam serves as machining beam.

The machining head of the "Trumatic® HSL 2502" device is adjustable in the direction of the axis of the machining beam (herein referred to as z-axis). The laser beam is supplied to the focusing optics with a optical fiber. The "Trumatic® HSL 2502" device further includes a collimator with collimating lens arranged between the focusing optics and the end of the optical fiber that lies towards the focusing optics. The laser beam passes through the collimating optics, which has an axis that extends parallel to the throughput direction of the laser beam at the collimating optics.

In the "Trumatic® HSL 2502" device, the laser beam serving to cut metal sheets is generated by a solid-state laser and is supplied for laser cutting via an optical fiber. The focusing lens, which directs the laser beam toward the metal sheet to be machined, is housed in a laser cutting head. The collimating lens orients the laser beam in a parallel manner after emerging from the optical fiber.

The collimating lens of the "Trumatic® HSL 2502" device is arranged inside a collimation housing. The collimator or its collimation housing is rigidly connected to the laser cutting head of the "Trumatic® HSL 2502" device. To set a distance between the focusing lens and the surface of a metal sheet for a specific application and to maintain a set nozzle distance during the cutting process, the laser cutting head and the collimator or the collimation housing are jointly adjusted in the direction of the z-axis. Highly dynamic movements can be executed in particular during machining of the metal sheet.

In the "Trumatic® HSL 2502" device, the axis of the collimator coincides with the longitudinal axis of the collimation housing. In relation to the laser cutting head, the collimator is orientated so that its axis or the longitudinal axis of the collimation housing extends in the direction of the z-axis, i.e. in the direction of the axis of the laser cutting beam. Accordingly, a relatively great overall height of the optical system comprising the laser cutting head and the collimator or the collimation housing is produced in this direction.

A number of embodiments have been described. Nevertheless, it will be understood that various modifications may be made without departing from the spirit and scope of the invention. Accordingly, other embodiments are within the scope of the following claims.

What is claimed is:

1. A device for laser machining, the device comprising:
an optical system including a collimator, one or more deflecting optics, and a machining head, the optical system configured to provide an optical beam path for laser light from an input of the collimator to an output of the machining head,
the collimator comprising one or more collimating optics arranged in the optical beam path and configured to direct the laser light along a collimator axis,
the machining head including one or more focusing optics and configured to direct the laser light through the output towards a workpiece,
the one or more deflecting optics arranged between the collimating optics and the focusing optics and configured to deflect the laser light emerging from the collimating optics towards the focusing optics,
wherein the machining head is adjustable relative to the workpiece with dynamic adjustment movements along a z-direction perpendicular to the workpiece and
wherein the collimator projects in the direction of an axis of the collimator and the collimator axis extends transversely to the z-direction while the collimator is fixed in the z-direction.

2. The device of claim 1, wherein the optical system comprises a carriage, the collimator being fixedly arranged in the z-direction relative to the carriage and the machining head being translatable in the z-direction relative to the carriage.

3. The device of claim 1, wherein the collimator is configured such that the optical beam path within the collimator extends at a right angle with respect to the z-direction and the deflecting optics are configured to deflect the laser light by 90°.

4. The device of claim 1, wherein the optical system comprises a beam guidance chamber for the laser light positioned between the collimator and the machining head, wherein the beam guidance chamber includes a chamber wall connected to the collimator and the machining head and the beam guidance chamber is configured to be adjustable in length in the z-direction.

5. The device of claim 4, wherein the chamber wall of the beam guidance chamber is at least partly formed by a bellows that is extendable and compressible in the z-direction.

6. The device of claim 4, wherein the beam guidance chamber is filled with a gaseous medium and is substantially hermetically sealed and fluidically connected to a gas compensation chamber to compensate for volume changes in the beam guidance chamber.

7. The device of claim 4, wherein during operation, the internal pressure in the beam guidance chamber is increased in relation to the pressure in the environment surrounding the beam guidance chamber.

8. The device of claim 4, wherein the beam guidance chamber includes, in its interior, a dirt absorber for absorbing contaminants within the beam guidance chamber.

9. The device of claim 1, further comprising a motion unit with a bridge and a first translation drive, the optical system mounted to the bridge via the first translation drive to be movable along a y-direction, the y-direction being orthogonal to the z-direction.

10. The device of claim 9, wherein the motion unit further comprises a mechanical base and a second translation drive, the bridge mounted to the mechanical base via the second translation drive to be movable along an x-direction, the x-direction being orthogonal to the y-direction and the z-direction.

11. The device of claim 1, wherein the optical system comprises a third translation drive configured to move the machining head along the z-direction relative to the collimator.

12. The device of claim 1, wherein the optical beam path of the laser light within the collimator is configured to have an angle in the range between and including 45° and 90°.

13. The device of claim 1, wherein the optical beam path of the laser light emerging from the collimating optics to the deflecting optics extends transversely to the z-direction.

14. The device of claim 1, further comprising a light source and an optical fiber, wherein the light source is optically connected to the input of the collimator via the optical fiber.

15. The device of claim 14, wherein the axis of the optical fiber at the input of the collimator is at an angle in the range between and including 45° and 90° with respect to the z-direction.

16. A device for laser machining, the device comprising:
a machining head for directing laser light towards a workpiece, the laser light being emitted from a laser light source and directed along an optical beam path and the machining head including one or more focusing optics that are arranged in the optical beam path;
a collimator including one or more collimating optics that are arranged in the optical beam path in front of the focusing optics and the collimator projecting in the direction of an axis of the collimator that extends parallel to the main direction of the laser light at the collimating optics;
one or more deflecting optics arranged in the optical beam path between the collimating optics and the focusing optics, the deflecting optics configured to deflect the laser light emerging from the collimating optics towards the focusing optics,
wherein the machining head is adjustable relative to the workpiece with dynamic adjustment movements along a z-direction perpendicular to the workpiece, and the axis of the collimator extends under an angle to the z-direction while the collimator is fixed in the z-direction.

17. The device of claim 16, wherein the axis of the collimator extends at an angle in the range between and including 45° and 90° with respect to the z-direction.

18. A device for laser machining, the device comprising:
a machining head for directing laser light towards a workpiece, the laser light being emitted from a laser light source and directed along an optical beam path and the machining head including one or more focusing optics that are arranged in the optical beam path;
a collimator including one or more collimating optics that are arranged in the optical beam path in front of the focusing optics and the collimator projecting in the direction of an axis of the collimator that extends parallel to the main direction of the laser light at the collimating optics;
one or more deflecting optics arranged in the optical beam path between the collimating optics and the focusing optics, the deflecting optics configured to deflect the laser light emerging from the collimating optics towards the focusing optics,
wherein the machining head is adjustable relative to the workpiece with dynamic adjustment movements along a z-direction perpendicular to the workpiece, and the axis of the collimator extends transversely to the z-direction while the collimator is fixed in the z-direction.

* * * * *